July 1, 1958 — B. A. BUSS — 2,841,176
WASHER SUPPLY CONTROLS
Filed May 22, 1953 — 3 Sheets-Sheet 1

BENJAMIN A. BUSS
*INVENTOR.*

BY
*J. M. Holmes*

July 1, 1958   B. A. BUSS   2,841,176
WASHER SUPPLY CONTROLS
Filed May 22, 1953   3 Sheets-Sheet 2

BENJAMIN A. BUSS
*INVENTOR.*

BY

July 1, 1958     B. A. BUSS     2,841,176
WASHER SUPPLY CONTROLS

Filed May 22, 1953     3 Sheets-Sheet 3

BENJAMIN A. BUSS
*INVENTOR.*

BY

United States Patent Office 2,841,176
Patented July 1, 1958

2,841,176

WASHER SUPPLY CONTROLS

Benjamin A. Buss, East Moline, Ill., assignor to American Machine and Metals, Inc., New York, N. Y., a corporation of Delaware Application May 22, 1953, Serial No. 356,665

1 Claim. (Cl. 137—565)

The invention relates to commercial washers of the automatic type in which an automatic device times the intervals between the dumpings of the bath and, after the bath is dumped, supplies the proper amount of hot and cold water to form a new bath of the proper depth for the next step in the washing operation.

The invention provides a supply feeder for automatically adding the proper amount of the proper supplies to each bath.

Automatic washers in which the supplies are added to the bath in the machine at the same time as the clothes are placed in the machine are well known, most household washers operating in this manner.

Commercial washers have been operated in a semi-automatic manner in which the machine is automatically stopped at the beginning of each step. The machine pauses there until supplies are added by hand as in the household washers. As these commercial machines have several suds steps after each one of which the bath is changed and new supplies added, this calls for admission of varying amounts of detergent three to six times and also the addition of bleach, sour and bluing at different times, such taking too much of the operator's time.

It has been proposed to have the operator fill each of a series of containers with supplies in the proper amount and sequence before starting a washing operation and to use a timer which dumps the contents of each container into the washing machine at the proper time.

This not only requires much attention on the part of the operator but makes the outcome of the washing operation dependent on the care which the attendant uses in filling the separate containers, the machine merely dumping the containers into the bath at the proper time. If a container is too full, or empty, or contains the wrong material, the process will go on just the same.

This invention especially relates to automatic washers operating in a plurality of steps calling for supplies which are admitted to the washer in quantities measured out at the appropriate time from storage tanks provided for each of the supplies.

Some supplies are solid—such as most detergents; other supplies are liquid such as bleach or sour. The amount of each supply to be added at a given stage of operations is to be determined by the length of time the program controller gives a signal. In order to deliver an amount of supplies proportional to the length of the signal, the supplies must flow at a uniform rate per minute. To accomplish this the invention contemplates converting each supply into a solution of known strength. Further, to secure a uniform rate of delivery which is not possible if the liquid is drawn by gravity from tanks wherein the liquid stands at varying levels, at various times, the liquid is fed to the washer by a constant delivery pump that draws from the appropriate storage tank.

Thus the invention starts a constant delivery pump at a proper time, operates it for a definite length of time, connects the pump to the proper supply stored in a known concentration and thus supplies the proper quantity of the supply at the right time automatically.

The supply tanks may be large enough to carry a day's need.

The attendant merely fills the tank which may have a volume of one or more barrels once a day. It is desirable to have the tank standing on the floor so that the top of the tank is readily accessible to the operator for refilling. As the floor around the washer is wet, it has been found necessary to put the pump that draws the supplies from the tank on top of the tank.

The invention contemplates:

a. Converting the solid supplies into solutions of a standard concentration.

b. Providing a supply tank for each supply; placing the tank close to the washer, preferably in the back of the washer and standing on the floor so that the attendant can readily reach the top of the tank when he adds supplies.

c. Placing a single positive-delivery, constant rate of delivery pump above the level of the top of the tanks to draw the liquid out of the tank by suction and to discharge a constant quantity per second into the washer regardless of the relative level of the liquid in the tank and the washer.

d. Heating the soap tank and placing the pump and the manifold leading to the pump above the soap tank to prevent the soap solution clogging the lines.

e. A short manifold leading to the pump into which a suction pipe leads from each of the supply tanks. A solenoid operated valve in each suction line determines which supply is to be pumped.

f. Means to flush the manifold and pump at intervals and to direct the flushing water into the washer.

g. Means to start the pump only when supplies or flushing water are to be pumped.

h. A controller that actuates each valve at the proper time.

Figure 1:
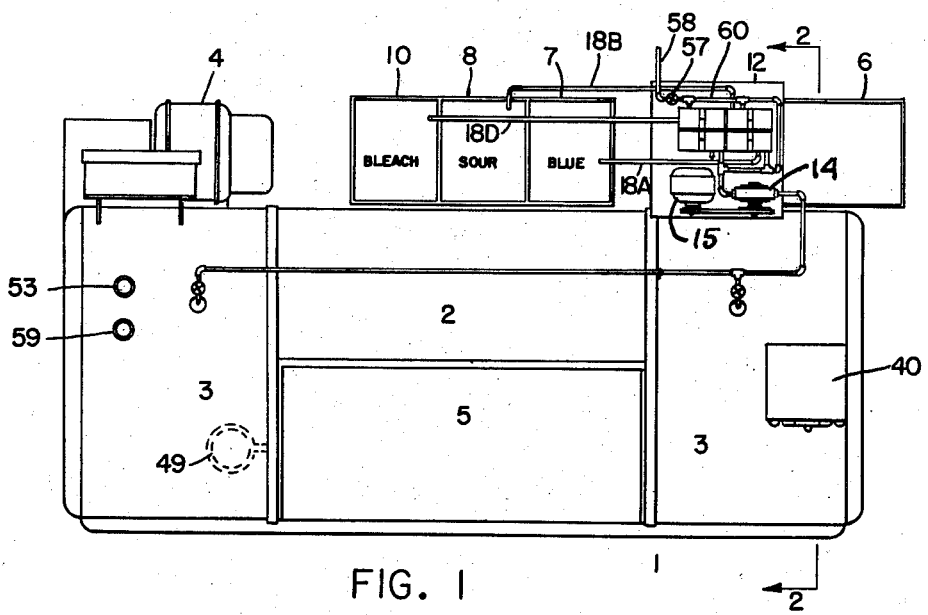
Figure 1 shows in plan view a commercial washer complete with supply tanks and means for feeding supplies from the tanks to the washer.
Figure 2:
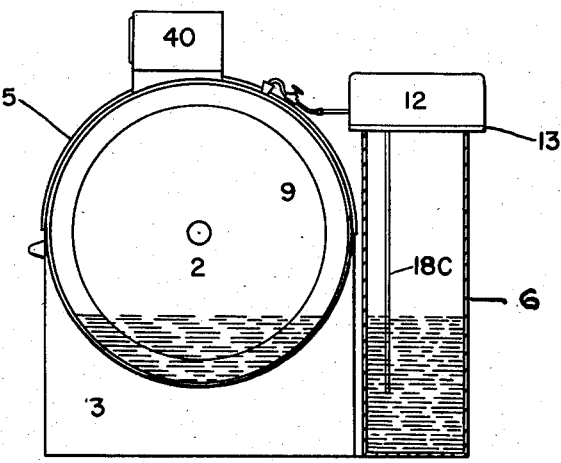
Figure 2 is a vertical section of the washer and supply tank shown in Fig. 1 along lines 2—2.
Figure 3:
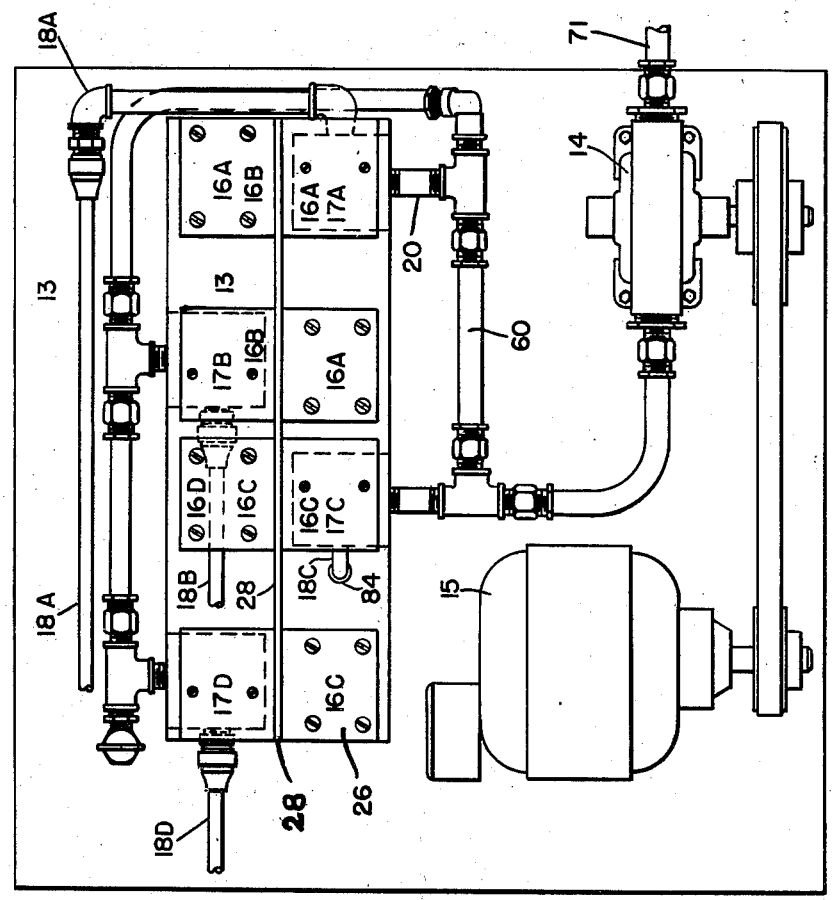
Figure 3 is a plan view drawn to an enlarged scale of the pump, supply lines, and valves used to transfer the supplies from the tanks to the washer.

In these figures showing one form of the invention, 1 indicates generally a washer which may have a horizontal central cylindrical section 2 supported at its ends such as by hollow end posts 3. These end posts may house the water supply valves for hot and cold water and the drive by which the motor 4 turns a cylinder 9 housed inside of the cylindrical section 2 as shown in the patent granted A. F. Widigen on March 7, 1950 bearing No. 2,500,108.

Clothes to be washed are placed in the cylinder through a door 5.

Directly behind the washer 1 are the supply tanks 6, 7, 8, 10. Each will contain a different supply, such as soap, bleach, bluing, or sour. These tanks stand on the floor of the washroom and are open at the top permitting the attendant to fill them. Preferably these tanks are of such a size that the washer may run all day on a single store of supplies.

To prevent the soap from solidifying in the lines, the soap tank 6 may be provided with a steam coil not shown.

The apparatus for selectively feeding the proper amount of each supply is housed in the cabinet generally indicated at 12.

Figure 4:
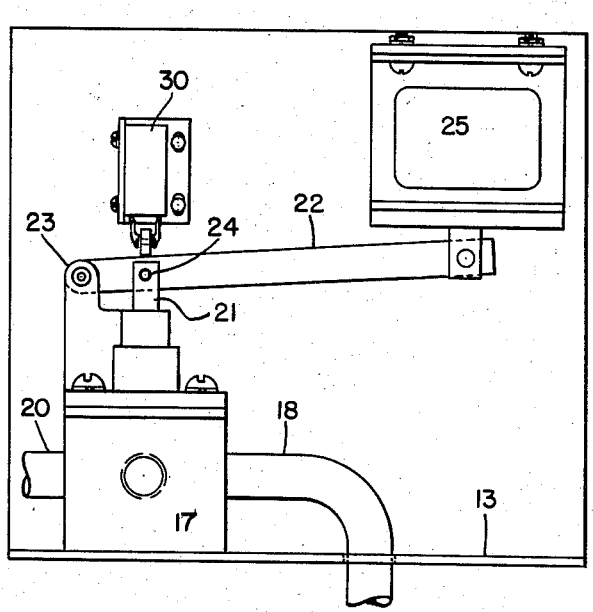
Figure 4 shows one of the devices controlling the flow of a particular supply in elevation and is drawn to a still larger scale.
Figure 5:
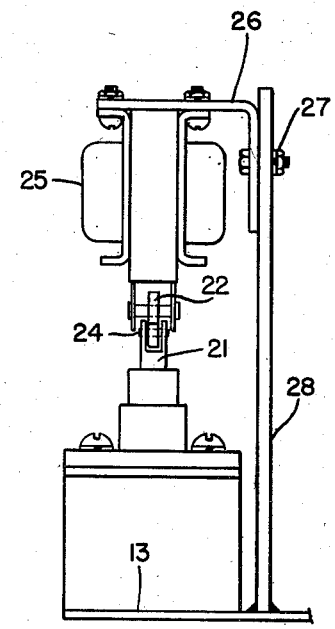
Figure 5 shows the same device in end elevation.

This cabinet has a base plate 13 preferably directly over the soap tank so that the soap supply line is short and the heat rising from the soap tank will keep the soap in the line fluid. Supported on this base plate is a constant-rate-of-delivery pump 14 adapted to be driven by motor 15. There is also one unit of the type shown in Figs. 4 and 5 for each supply. These units are numbered 16A, 16B, 16C, and 16D.

Each such unit includes a valve block 17. The valve is normally closed and prevents the flow of fluid from line 18 to line 20. Flow through the valve block takes place when the valve stem 21 is elevated. This may be done, for example, by lifting the right-hand end of the bar 22 pivoted to the valve housing at 23 and connected to the stem 21 at 24. The right hand end of bar 22 may be elevated to open the valve 17 by energizing the solenoid 25.

The valve block 17 is attached to the plate 13 while solenoid 25 is carried by a plate 26 bent at right angles whose vertical leg has slots through which bolts 27 pass. Thus the solenoid may be adjusted vertically and then held rigid against plate 28 which is attached to the base plate 13.

The plate 28 also carries, adjustably mounted, a microswitch 30 for each valve block 17. The switch is mounted so that when bar 22 is elevated the microswitch 30 is closed. These microswitches 30 are all mounted in parallel between two wires so that the closing of any one of the microswitches 30 will allow current to flow from L1, line 31, line 32, microswitch 30, lines 39, 33 to motor 15, that drives pump 14. This circuit is completed through lines 34, 35, 36 to L2.

Figure 6:
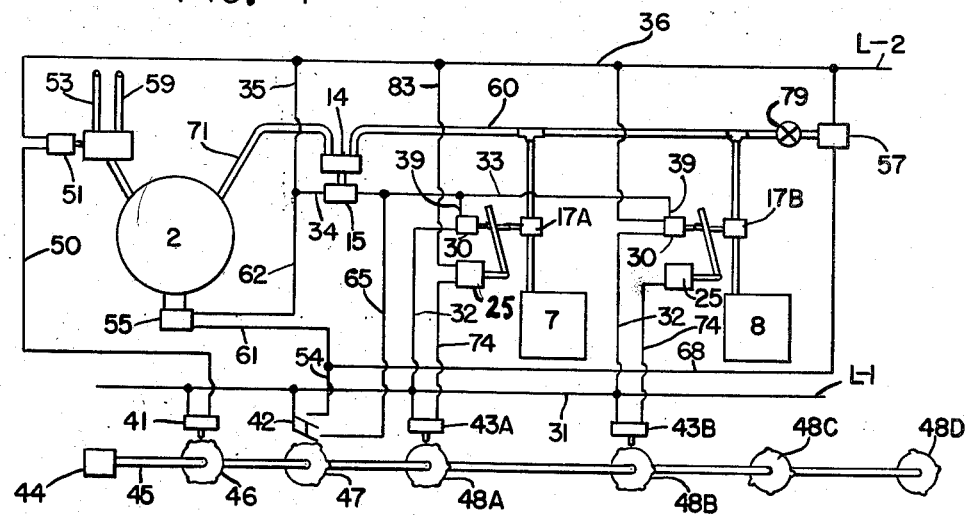
Figure 6 shows in diagrammatic form the electric circuits that actuate the valves and the control.

The diagrammatic circuit in Fig. 6 shows a cam 48A controlling the switch 43A. This feeds current through line 74 to a solenoid 25 that opens valve 17A thus feeding one type of supply from tank 7. The diagram shows in detail only one additional duplicate set of units which controls the feed of a second type of supply through cam 48B controlled valve 17B.

In practice there may be any number of additional supply units controlled by additional cams such as 48C, 48D.

The inlet pipe 18C which leads to valve 17C may extend down into the soap tank through a hole 84 in plate 13. Similarly the inlet pipe 18A that leads to valve 17A may extend downward into tank 7, while the inlet pipe 18B may extend down into the tank 8. Finally, inlet 18D may extend down into tank 10. Whatever valve is open allows solution from a storage tank to be drawn by pump 14 and discharged through line 71 into the washer 2.

The automatic control generally indicated at 40 may be of any type that closes switches 41, 42, 43A, 43B, at predetermined times.

The control is diagrammatically illustrated by a time clock motor unit 44 driving a shaft 45 carrying cams 46, 47, 48A, 48B, 48C, 48D.

Cam 46 controls the supply of water to the washer when switch 41 is closed by the cam 46 current flows from L1 through 41 and line 50 to an electrical control device 51 for admitting hot and cold water to the washer through feed lines 53, 59. There are many such devices which will, upon excitation by a single electrical line 50 admit hot and cold water from pipes 53, 59 in such proportion as to achieve a definite temperature of the tank and to shut off the admission of water when the bath has reached a given depth as measured by some such device as the conventional float, not shown, in a tank 49 connected to the washer housing 2. Such a device is shown in my Patent No. 2,612,035 entitled, "Control Station for Operating Washers with a Single Bath," issued September 30, 1952.

The cam 47 controls the dump valve that allows the dirty water to run off to the drain. It also controls the flushing out of the manifold 60 and the pump 14 to prevent the accumulation or solidification of detergents.

When cam 47 closes switch 42, current flows through lines 54, 61, to a device that opens dump valve 55 draining the washer 1. The circuit is completed through 62, 35, 36, L2. Such a device is shown in Patent 2,443,816 granted Archibald Davis, Jr. on June 22, 1948 entitled, "Discharge Valve." Current also flows through line 65 to motor 15 which starts the pump 14 and through line 68 to open valve 57 which is connected to a water supply line. A regulating valve 79 may be inserted in line 80 leading to a pump 14.

Cam 48A controls the supply of the contents of tank 7 through valve 17A. When the cam 48A closes switch 43A current flows from L1 through 35, 43A, 74, to solenoid 25, line 83, line 36, L2.

This lifts the bar 22 that opens valve 17A connecting tank 7 to manifold 60. The bar also closes switch 30 that allows current to flow from L1, line 32, switch 30, line 39, line 33, motor 15, lines 34, 35, 36 to L2. This starts the motor which will draw supplies from the tank 7 and deliver them to the washer 2 as long as the cam holds the switch 43A closed.

Each of the remaining cams 48B, 48C, 48D similarly operates the feeding of one of the supplies to the washer. Each cam controls the switch that energizes the solenoid which both opens a valve leading from a supply tank to a manifold and starts the motor driving the pump.

In the operation of the device the supply tanks are filled, each with a different supply in a solution of known concentration. The automatic timer, comprising motor 44, shaft 45, cams 46, 47, 48A, 48B, 48C, and 48D is so adjusted that it will give the required sequence of the steps controlling the length of each, dumping the liquid contents at the proper time, filling the washer with water at the proper temperature, adding supplies as needed for the particular steps. In the diagrammatic illustration here shown the length of the raised portion of the cams and the speed of the shaft 45 are adjusted to secure the desired results. The shaft 45 makes one revolution for one entire washing operation.

While I have shown and described in some detail one modification that my invention may take, it is to be understood that I am to be limited in my invention only by the scope of the following claim.

I claim:

In a device for feeding supplies to the cylinder of a washer, in combination, a plurality of supply containers adjacent said cylinder, separate suction lines leading from each container to a normally closed valve therefor having an operating rod, a common base for all of such valves, a wall rising from said base, a solenoid for each of said valves carried by said wall, mechanism connecting the operating rod of each valve with its solenoid which when the solenoid is actuated, holds the valve open, a common manifold means connecting with all of said valves, a motor driven constant delivery pump, and a switch adjacent each of said mechanisms which is closed by the movement of the operating rod to open the valve, said switch supplying current to operate said pump when it is closed.

References Cited in the file of this patent

UNITED STATES PATENTS

| | | |
|---|---|---|
| 2,039,534 | Holmes | May 5, 1936 |
| 2,137,928 | Tanqueray | Nov. 27, 1938 |
| 2,197,294 | Brockbank | Apr. 16, 1940 |
| 2,355,162 | Hovey | Aug. 8, 1944 |